US006558013B2

(12) United States Patent
Tholin et al.

(10) Patent No.: US 6,558,013 B2
(45) Date of Patent: May 6, 2003

(54) LIGHT-EMITTING KEY WITH MULTIPLE INDEPENDENTLY-ILLUMINATED MESSAGES, IN PARTICULAR FOR AN AVIATION EQUIPMENT PANEL, AND A STRIP CONSTITUTED BY SUCH KEYS

(75) Inventors: Francis Tholin, Suresnes (FR); Antoinette Gomez, Paris (FR)

(73) Assignee: TEAM, Rungis (FR)

( * ) Notice: Subject to any disclaimer, the term of this patent is extended or adjusted under 35 U.S.C. 154(b) by 0 days.

(21) Appl. No.: 09/924,449

(22) Filed: Aug. 9, 2001

(65) Prior Publication Data

US 2002/0021562 A1 Feb. 21, 2002

(30) Foreign Application Priority Data

Aug. 11, 2000 (FR) ........................................... 00 10587

(51) Int. Cl.[7] ............................................... G01D 11/28

(52) U.S. Cl. ......................... 362/29; 362/235; 362/237; 362/244; 362/85; 460/490; 116/279

(58) Field of Search .......................... 362/29, 227, 228, 362/235, 237, 244, 85, 23; 400/490, 493, 494; 341/22; 345/170; 200/313, 314, 315; 116/279, 281

(56) References Cited

U.S. PATENT DOCUMENTS

| | | | | |
|---|---|---|---|---|
| 3,093,718 A | | 6/1963 | Blomquist | 200/314 |
| 3,601,567 A | * | 8/1971 | Shah | 200/314 |
| 3,639,745 A | * | 2/1972 | Shiki | 200/311 |
| 3,663,780 A | * | 5/1972 | Golbeck | 200/314 |
| 3,989,912 A | * | 11/1976 | Francke | 200/531 |
| 4,535,396 A | | 8/1985 | Guthrie | 362/293 |
| 4,991,535 A | * | 2/1991 | Kobayashi et al. | 116/28.1 |
| 5,159,892 A | * | 11/1992 | Hara et al. | 116/28.1 |
| 5,432,684 A | * | 7/1995 | Fye et al. | 362/30 |
| 5,899,553 A | * | 5/1999 | Howell | 362/84 |
| 6,220,738 B1 | * | 4/2001 | Donner | 362/545 |
| 6,326,569 B1 | * | 12/2001 | Ardrey et al. | 200/314 |

FOREIGN PATENT DOCUMENTS

| | | |
|---|---|---|
| JP | 11-73838 | 3/1999 |

* cited by examiner

*Primary Examiner*—Sandra O'Shea
*Assistant Examiner*—Sharon Payne
(74) *Attorney, Agent, or Firm*—Sughrue Mion, PLLC

(57) ABSTRACT

The invention relates to a light-emitting key with multiple independently-illuminated messages for fitting to an equipment front panel, in particular for aviation equipment, the key comprising a bearing rim and a hollow key body terminated by a front, drive face covered by a mask etched with messages to be illuminated, said key body being connected to said bearing rim by means of a peripheral ligament, said body, said ligament, and said rim being made as a single piece of flexible material. According to the invention, a slab of translucent material subdivided into blocks by at least one opaque partition extending substantially perpendicularly to the front face is received inside the key body so as to extend as far as the front, drive face of the key.

12 Claims, 2 Drawing Sheets

LIGHT-EMITTING KEY WITH MULTIPLE INDEPENDENTLY-ILLUMINATED MESSAGES, IN PARTICULAR FOR AN AVIATION EQUIPMENT PANEL, AND A STRIP CONSTITUTED BY SUCH KEYS

The invention relates to light-emitting keys, in particular to light-emitting keys having multiple independently-illuminated messages for equipment panels, in particular in the aviation or automotive industries.

The term "message" is used to designate any type of pattern, of symbolic or alphanumeric type, generally carried on the front face of a key or a button, indicating the function of the button and, where appropriate, the state of one or more actions controlled by said key or said button.

BACKGROUND OF THE INVENTION

Light-emitting keys used for aviation equipment must perform several functions in spite of their small size, which contributes to presently-encountered keys being complex. These keys must simultaneously provide both an electrical contact by applying pressure on a contactor installed on the panel, and also information by means of light signaling, in general making use of a transparent front face fitted with a message-forming mask, which is back-lit by internal lighting.

With some keys, it is advantageous to be able to have at least two different sources of light, so as to be able to illuminate two or more different messages selectively, e.g. ON and OFF, with ON being illuminated in green and OFF in red. This kind of key is referred to herein as a light-emitting key with multiple independently-illuminated messages. The light sources can be of the same color or of different colors.

Keys are known that comprise a base fitted with an electrical contactor and at least two light sources, and including a pushbutton in register with the contactor and the light sources, said button projecting from the panel. Reference can be made to document U.S. Pat. No. 3,093,718, for example. The button is constituted by a rigid body made by injection molding, which body has an internal housing for a pusher fitted with a spring forming resilient button return means and actuating the contactor. The front face of the button is closed by a label (or "slide") carrying the two messages for illumination in the form of transparencies. The inside of the button body is partitioned so that each light source illuminates only one message. The inside of the button body is generally painted white so as to improve light diffusion. In addition, a gasket is fitted around the button body so as to be clamped between the button body and the panel.

The structure of such a key makes use of numerous parts, thereby making the product expensive to manufacture and to maintain. In addition, building up strips of keys on a common base is difficult. Furthermore, such keys are not completely leakproof and moisture can infiltrate between the button body and the panel in spite of the sealing gasket.

Document U.S. Pat. No. 4,535,396 describes a pushbutton of design analogous to the above pushbutton, but made in simpler manner. It comprises a partitioned cage having two translucent blocks engaged therein, the cage being inserted in a body between a slide and a light-emitting diode (LED) support, and the end result forming a rigid assembly that is associated with a return spring. In that arrangement, the translucent block performs an optical function only.

Also known are keys comprising a button that is integral with a bearing rim, to which it is connected by a flexible peripheral ligament forming the resilient return member. Electrical contact is obtained by the presence of an internal central finger integrally molded with the button and pressing against an electrical contactor carried by the panel. To obtain light-emitting keys, that type of button is molded out of a translucent material, and then its outside is painted black. The front face is then etched or fitted with a slide, e.g. by adhesive. A light-emitting key is thus obtained very simply. Unfortunately, it is not possible with that kind of key to obtain independent illumination of a plurality of messages, because the transparency of the material used would mean that the various light sources would illuminate all the messages carried by the front face equally, giving rise to confusion as to the message being signaled.

The state of the art is also illustrated by document JP-A-1 173 838. That document describes a pushbutton having a unitary element of flexible design, comprising a bearing rim and a hollow key body connected by a peripheral ligament, the body being compartmentalized by a central partition. Nevertheless, the key body is covered in a rigid cap, whose presence is made necessary by the absence of a translucent block inside the key.

Reference can also be made to document JP-A-01 211 195 which describes an analogous arrangement.

OBJECTS AND SUMMARY OF THE INVENTION

An object of the invention is to provide a light-emitting key with multiple independently-illuminated messages and that does not present the above-mentioned drawbacks and limitations.

More particularly, the invention provides a light-emitting key with multiple independently-illuminated messages for fitting to an equipment front panel, in particular for aviation equipment, the key comprising a bearing rim and a hollow key body terminated by a front, drive face covered by a mask etched with messages to be illuminated, said key body being connected to said bearing rim by means of a peripheral ligament, said body, said ligament, and said rim being made as a single piece of flexible material. According to the invention, a slab of translucent material subdivided into blocks by at least one opaque partition extending substantially perpendicularly to the front face is received inside the key body so as to extend as far as the front, drive face of the key.

The translucent block of the above-mentioned light-emitting key serves not only to convey light, but also to stiffen the body of the key which is of flexible design, thereby eliminating the need for a rigid cap.

Thus, if the panel is fitted with two different light sources, each block channels the light from one of the sources independently, with each light path being separated from the other by an opaque partition. Each source can thus illuminate a different message forming part of a common mask, each message being in register with one of the blocks.

Advantageously, the bearing rim is shaped to present a peripheral projection projecting towards the front panel and acting as a sealing gasket. Sealing is thus provided without it being necessary to fit a gasket.

In a first embodiment of the key, the blocks are joined together at the front face.

The opaque partition separates them, but the blocks are always held together by a thin ligament sandwiched between the partition and the mask. This makes the blocks easier to handle during manufacture of the key, particularly when more than two blocks are used. In addition, the above-mentioned ligament reinforces the front face of the key body.

In a variant embodiment, the blocks are separate. The two light paths are thus totally separated, optically, since the opaque partition can extend as far as the mask.

In a first aspect, the mask is a label carrying the messages to be illuminated as transparencies.

This makes it very easy to fit the mask on the front face, thus making it possible to produce light-emitting keys that are all the same and to distinguish them by the labels they carry.

In a second aspect, an opaque covering covers the drive face, allowing the messages for illumination to show through in the drive face.

The messages are easily obtained by laser etching methods. Depending on circumstances, these messages can be invisible when the light is out, or they can be made legible in daylight by means of a translucent paint.

For keys of the type including an internal finger for driving an electrical contactor of the panel, the finger is advantageously carried by the opaque partition.

In a first method of manufacturing the key, the blocks are secured in the key body by means of adhesive.

In a second implementation, the blocks snap-fasten in the key body.

In a third implementation, the key body and its partition (s), together with the associated bearing rim, are overmolded onto the blocks, being made of a material that is opaque.

The invention also provides a strip of light-emitting keys, the strip being constituted by a plurality of juxtaposed keys presenting at least one of the above-specified characteristics, the bearing rim of said keys forming a peripheral bearing rim for said strip.

BRIEF DESCRIPTION OF THE DRAWINGS

Other characteristics and advantages of the invention appear more clearly in the light of the following description of a particular and non-limiting embodiment of the invention, given with reference to the figures of the drawings, in which.

MORE DETAILED DESCRIPTION

Figure 1:
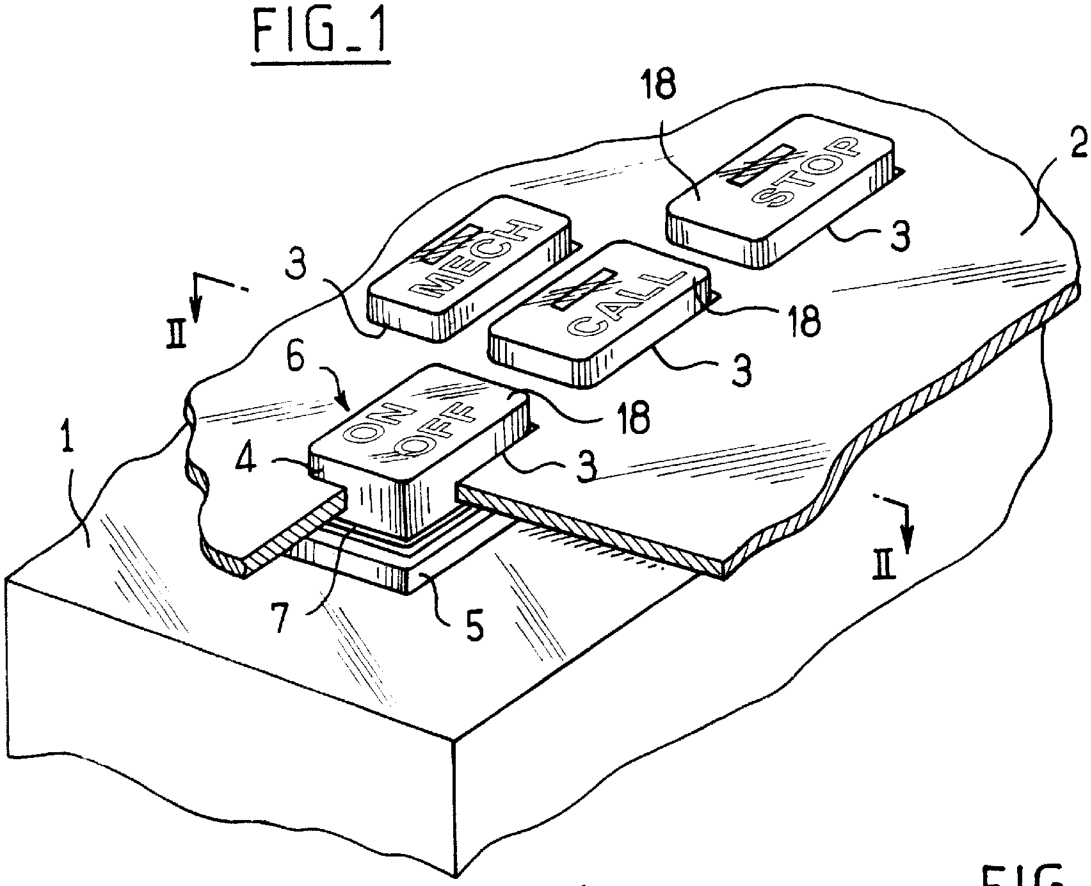
FIG. 1 is a perspective view, partially in section, of a panel assembly fitted with multiple-message light-emitting keys of the invention.
Figure 2:
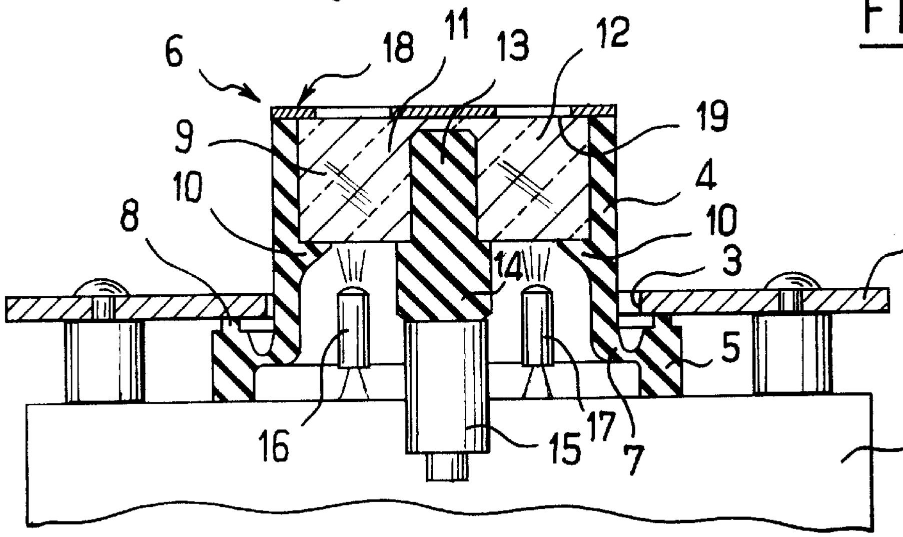
FIG. 2 is a section view on II—II through a key having multiple independently-illuminated messages in accordance with the invention and FIG. 2A illustrates a key with separate blocks.

In FIGS. 1 and 2, a piece of equipment 1 of the calculator type or indeed an aviation control unit is fitted with a front panel 2 having at least one orifice 3 formed therein to receive a rectangular key body 4 that projects from the panel and that together with a bearing rim 5 forms a key 6 of the invention. The bearing rim 5 is sandwiched between the equipment 1 proper and its front panel, such that said rim 5 is prevented from moving between these two elements. The key body 4 is connected to the bearing rim 5 via a flexible peripheral membrane or ligament 7 acting as a spring for returning the key body 4 after it has been pressed. The key body 4, the ligament 7, and the bearing rim 5 are made as a single piece of flexible material.

Figure 2A:
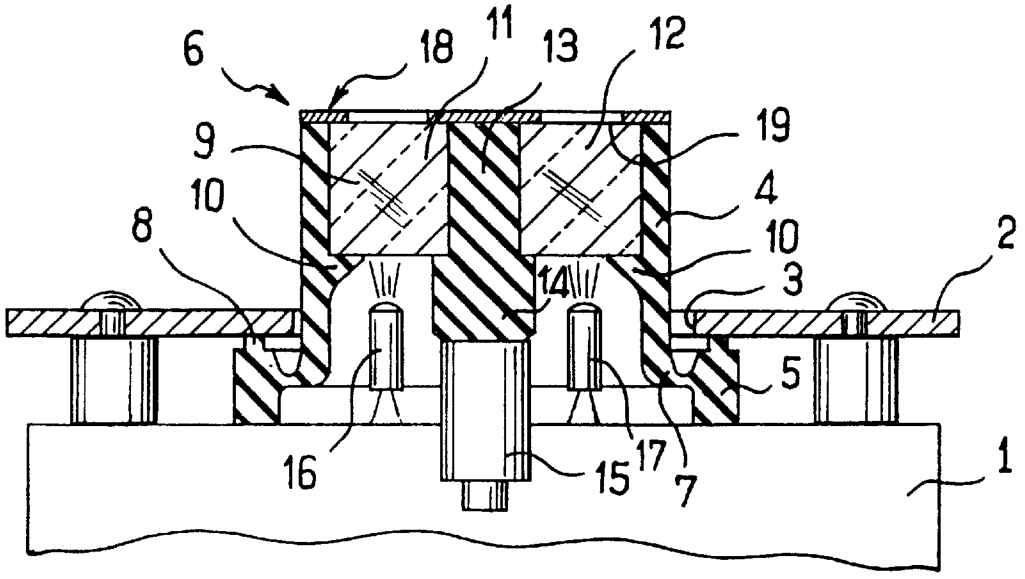

The bearing rim 5 also presents a sealing gasket 8 projecting towards the panel 2 for the purpose of preventing moisture infiltrating under the panel 2. In this case, the gasket 8 is integrally molded with the bearing rim 5 and therefore does not constitute a separate component as used to be the case in prior art keys. Inside the key body there is received a slab 9 of translucent material, e.g. silicone, against a rim 10 inside the key body, said slab 9 being subdivided into two blocks 11 and 12 by means of an opaque partition 13 separating the two blocks 11 and 12 over the full dimension of the key body 4. The partition 13 thus splits the slab 9 across the entire length of the key body 4. The blocks 11 and 12 contribute to providing the key body 4 with structural stiffness, even though the key body itself is made of a flexible material. The blocks 11 and 12 can remain attached to each other by means of a thin ligament at the front face 19, as can be seen in FIG. 2. The set of blocks is thus easier to handle during manufacture of the key, and the front face is reinforced. In a variant, the blocks can be completely independent. FIG. 2A illustrates this variant. The blocks 11,12 are totally independent and separated by the opaque partition 13 extending up to the front face 19. The blocks 11,12 are then disjoint.

In this case, the blocks 11, 12 are held inside the key body by an internal peripheral rim 10 which serves to hold the blocks 11, 12 inside the key body 4.

In a variant, the blocks 11, 12 can be held inside the key body 4 by adhesive.

In another variant, an opaque material, e.g. silicone, is overmolded onto the blocks 11, 12 so as to form the key directly on the blocks. This variant is particularly advantageous for rationalizing manufacture, particularly if it is desired to make strips of keys, as is described below with reference to FIG. 3.

Each of the blocks 11 and 12 conducts light coming from a respective light source 16 or 17 connected to the equipment and disposed behind the corresponding blocks 11 or 12. By way of example, these light sources can be LEDs under the control of defined logic contained within the equipment. The presence of the opaque partition 13 prevents a light source associated with one of the blocks from illuminating the adjacent block. Each block thus leads to a single light source only.

If the light sources are of different colors, then a two-color key is obtained. In a variant, two different colors can be obtained with two same-color sources by coloring the blocks, or by fitting them with internal or external color filters.

The blocks 11 and 12 extend as far as a front drive face 19 so as to convey light out from the light-emitting key 6. The front face 19 is covered by a mask 18. As can be seen in FIG. 1, the masks 18 are transparent to reveal two patterns for each two-message light-emitting key, some of which patterns correspond to messages that are readable such as ON, OFF, CALL, STOP, MECH, while others are symbolic being constituted by a square, a rectangle, or any other shape, each pattern overlying a respective block. Each pattern or message is thus illuminated by a single source.

The mask 18 can be constituted by a label which is stuck on the front face 19. In a variant, the mask can be made by covering the front face 19 in an opaque coating and then in removing a portion of the coating corresponding to the desired message or pattern, e.g. using a laser etching method.

The messages can be invisible, i.e. the messages cannot be read in daylight unless they are illuminated; alternatively, the messages can be made legible in daylight, e.g. by using a translucent paint.

The partition 13 carries a projecting finger 14 extending towards the equipment in order to actuate an associated electrical contactor 15 secured to the equipment 1.

Figure 3:
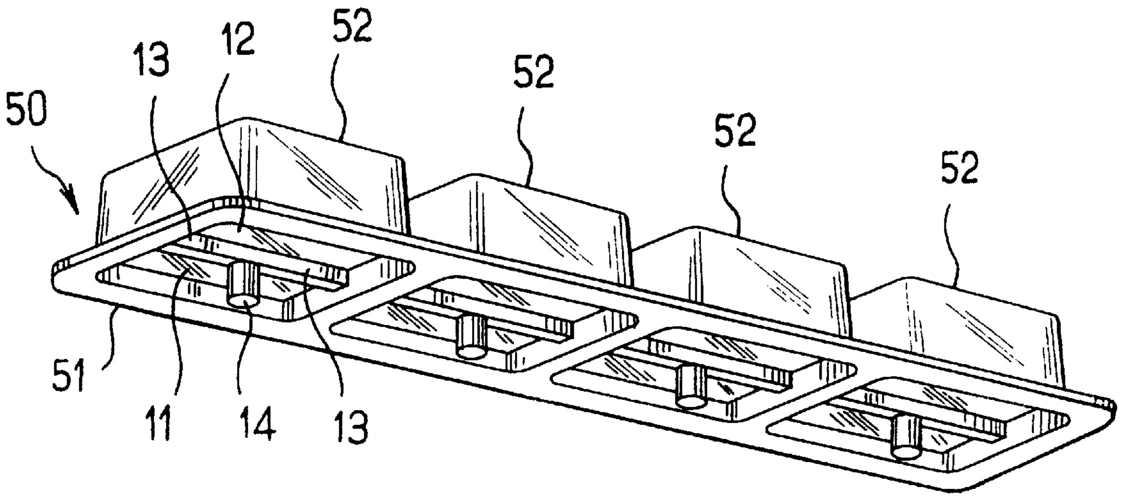
FIG. 3 is a perspective view of a strip of light-emitting keys made up of a plurality of juxtaposed keys of the above-specified type.

The internal arrangement of a key body can be seen more clearly in FIG. 3 which shows a series of key bodies 52 grouped together to form a strip referenced 50, comprising a common bearing peripheral rim 51 made up from the bearing rims of the light-emitting keys juxtaposed in this way. The peripheral gasket (not visible in this figure) then provides overall sealing for the entire strip formed in this way. Naturally, the keys can be grouped together in any other geometrical configuration, and in particular as a keypad.

FIG. 3 shows the partition 13 separating the blocks 11 and 12 over the entire length of each key body 52 and carrying a corresponding drive finger 14 projecting beyond the bearing rim 51.

The invention is not limited to the particular embodiment described above, but on the contrary seeks to cover any variant using equivalent means to reproduce the essential characteristics specified above.

In particular, the shape of a key is not restricted to being a rectangle, and on the contrary it can have any type of shape, being polygonal, circular, or otherwise.

The number of partitions could also be increased in conjunction with a larger number of blocks and thus a larger number of messages. Finally, in order to make keys having three or four messages, the partition(s) need not necessarily be rectilinear.

What is claimed is:

1. A light-emitting key with multiple independently-illuminated messages for fitting to an equipment front panel, in particular for aviation equipment, the key comprising a bearing rim and a hollow key body terminated by a front, drive face covered by a mask etched with messages to be illuminated, said key body being connected to said bearing rim by means of a peripheral ligament, said body, said ligament, and said rim being made as a single piece of flexible material, wherein a slab of translucent material subdivided into blocks by at least one opaque partition extending substantially perpendicularly to the front face is received inside the key body so as to extend as far as the front, drive face of the key.

2. A key according to claim 1, wherein the bearing rim is shaped to present a peripheral projection projecting towards the front panel.

3. A key according to claim 1, wherein the blocks are joined together at the front face.

4. A key according to claim 1, wherein the blocks are separate.

5. A key according to claim 1, wherein the mask is a label carrying the messages to be illuminated as transparencies.

6. A key according to claim 1, wherein the mask consists in an opaque covering covering the drive face and allowing messages to appear in said drive face by light transmission.

7. A key according to claim 5, wherein the messages are made visible in daylight by means of translucent paint.

8. A key according to claim 1, of the type comprising an internal drive finger for driving an electrical contactor of the equipment, wherein the finger is carried by the opaque partition.

9. A key according to claim 1, wherein the blocks are secured inside the key body by adhesive.

10. A key according to claim 1, wherein the blocks are snap-fastened inside the key body.

11. A key according to claim 1, wherein the key body together with the opaque partition(s) and the bearing rim associated therewith are made out of an opaque material that is overmolded on the blocks.

12. A strip of light-emitting keys with multiple independently-illuminated messages, the strip being made up of a plurality of juxtaposed keys according to claim 1, the bearing rims of said keys forming a peripheral bearing rim of said strip.

* * * * *